D. E. VIRTUE.
COMBINED CHURN AND BUTTER WORKER.
APPLICATION FILED AUG. 11, 1910.
1,030,356.
Patented June 25, 1912.
3 SHEETS—SHEET 2.
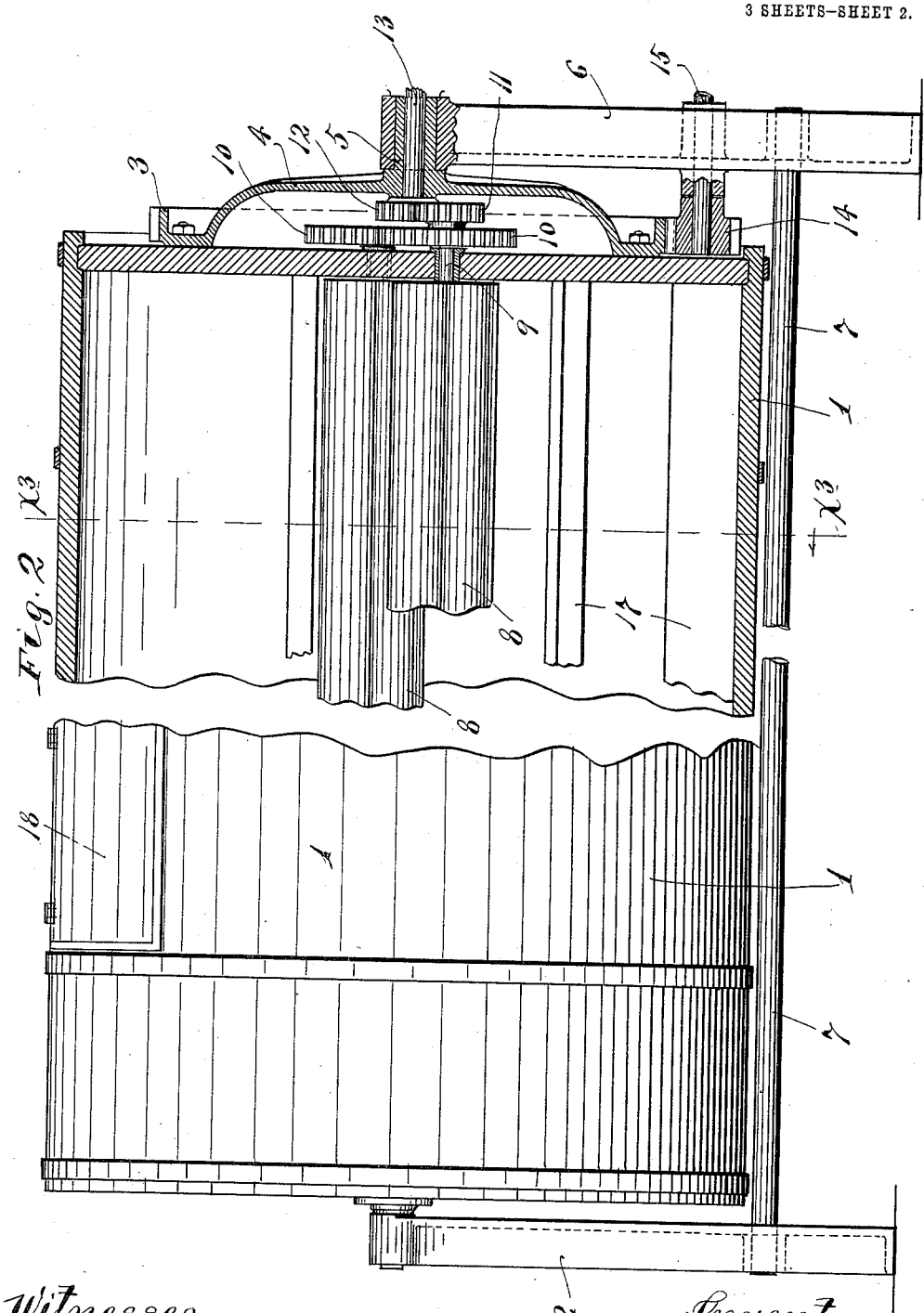
Witnesses.
A. H. Opsahl.
E. C. Skinkle
Inventor.
Dennis E. Virtue
By his Attorneys
Williamson Merchant

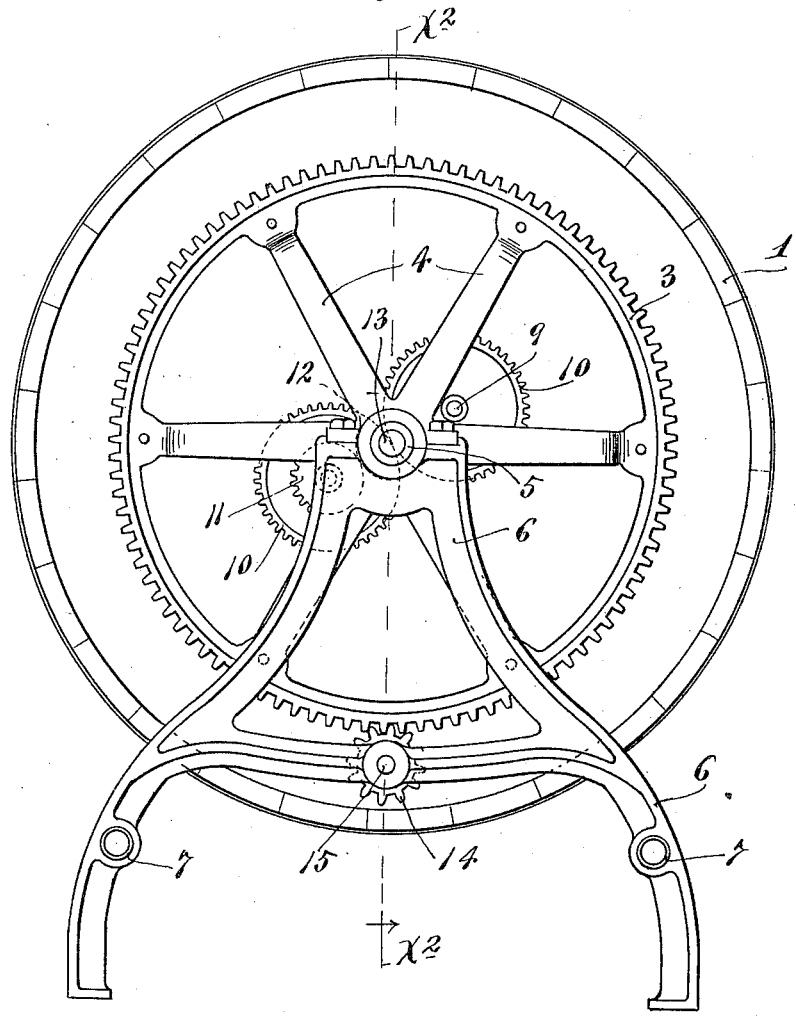

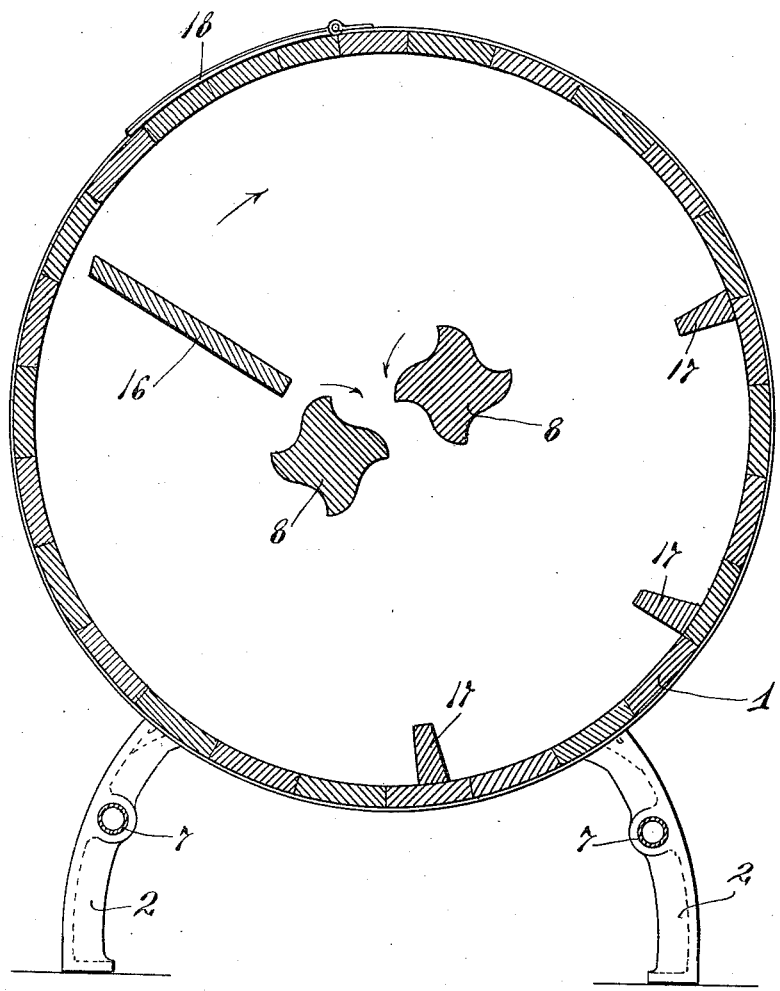

UNITED STATES PATENT OFFICE.

DENNIS E. VIRTUE, OF OWATONNA, MINNESOTA.

COMBINED CHURN AND BUTTER-WORKER.

1,030,356.

Specification of Letters Patent. Patented June 25, 1912.

Application filed August 11, 1910. Serial No. 576,658.

*To all whom it may concern:*

Be it known that I, DENNIS E. VIRTUE, a citizen of the United States, residing at Owatonna, in the county of Steele and State of Minnesota, have invented certain new and useful Improvements in Combined Churns and Butter-Workers; and I do hereby declare the following to be a full, clear, and exact description of the invention, such as will enable others skilled in the art to which it appertains to make and use the same.

My invention has for its object to provide a simplified and improved combined churn and butter worker of a type wherein a horizontally disposed rotary drum is employed.

To these ends the invention consists of the novel devices and combinations of devices hereinafter described and defined in the claim.

In the accompanying drawings, which illustrate the invention, like characters indicate like parts throughout the several views.

Referring to the drawings: Figure 1 is a view in front elevation showing the improved machine. Fig. 2 is a view partly in side elevation and partly in vertical section on the line $x^2$ $x^2$ of Fig. 1; and, Fig. 3 is a transverse vertical section taken on the line $x^3$ $x^3$ of Fig. 2.

The rotary drum 1 is preferably a wooden structure reinforced with suitable metal hoops, and at its rear end it is journaled to a bearing pedestal 2 while at its front end it is provided with a large spur gear 3 having laterally off set arms 4 connecting it to a tubular trunnion 5 that is journaled in a bearing pedestal 6. The two pedestals 2 and 6 are tied together by bars 7.

Located within the drum and extending from end to end thereof is a pair of coöperating corrugated working rollers 8 that are located equidistance from the axis of the drum and are spaced diametrically in respect to the said drum axis. At their front ends the shafts 9 of these rollers 8 project through suitable bearings in the drum head and are provided with suitable spur gears 10 that intermesh so that the said rollers will be reversely driven in respect to each other, as indicated by arrows marked adjacent thereto in Fig. 3.

One of the gears 10 is provided with a rigidly secured but laterally off-set pinion 11 that meshes with a pinion 12 carried by the inner end of a short counter-shaft 13 that is journaled in and extended through the hollow trunion 5.

Meshing with the large spur gears 3 on the front drum head is a pinion 14 that is carried by a counter-shaft 15 journaled in a suitable bearing in the front pedestal 6.

Any suitable driving mechanism may be provided for driving the counter-shafts 13 and 15, and it is only necessary for the purposes of this case to state that when the rollers 8 are driven as indicated by arrows in Fig. 3, the drum should be rotated in the direction of the arrows marked on the head thereof in the same view, and furthermore that the rotation of the rollers should be at a much higher rate of speed than that of the drum.

Located within the drum and extended from head to head thereto and rigidly secured to the latter, is a wide faced lifting shelf 16, the outer edge of which is preferably spaced from the shell of the drum, while the inner edge thereof barely clears the adjacent rollers 8. Furthermore, this lifting shelf 16 extends approximately tangential to the inner surface of the adjacent rollers 8, so that the butter lifted from the bottom of the drum, on the rising side of the drum, will be delivered directly between the coöperating reversely driven rollers 8. The drum is also preferably provided, at points remote from the shelf 16, with several lifting flights or cleats 17 which prevent undue slipping of the butter within the drum and furthermore assist both in the churning and butter working action. At a point which is just above the shelf 16, on the rising side of the drum, the said drum is provided with the customary opening normally closed by one or more doors 18.

In the churning action the shelf 16, as is obvious, serves as a main dasher to agitate and produce concussions in the can. The agitation is also produced by the action of the rollers 8 and of the flights 17. In the butter working action the body of butter is raised, once for each rotation of the drum, by the shelf 16 and is passed between the rollers 8 which, as already noted, are positively driven in reverse directions. The butter passed between the working rollers 8 will be dropped to the bottom of the drum and on to the flights 17 and with the latter will be creased or cut to an extent which materially assists in working the salt into the butter.

The improved churn and butter worker above described will be highly efficient, and has the very important merit of extreme simplicity of construction. The machine may, at comparatively low cost, be made strong and durable and furthermore has no parts that are likely to get out of order. Also the machine is capable of being very easily cleaned.

By referring to Fig. 3, it will be noted that the relatively wide lifting shelf 16 is on one side and all of the narrow lifting flights are on the opposite sides of an imaginary plane that is coincident with the axes of the two positively driven rollers 8. This arrangement disposes the flights 17 in such a way that they will immediately act upon the butter fed downward between the working rollers 8.

What I claim is:

In a combined churn and butter worker, the combination with a horizontal rotary drum provided within with a single wide lifting shelf and with a plurality of narrow flights, a pair of coöperating working rollers journaled to the heads of said drum and carried thereby, the axes of said rollers being equidistant from the axes of said drum and diametrically opposite to each other, the said rollers being located between said wide shelf and narrow flights, means for rotating said drum in a continuous direction, and means for continuously and positively rotating said rollers in opposite directions, at the same speed but at a higher speed than said drum.

In testimony whereof I affix my signature in presence of two witnesses.

DENNIS E. VIRTUE.

Witnesses:
HARLAN E. LEACH,
ELMORE L. LEACH.

---

Copies of this patent may be obtained for five cents each, by addressing the "Commissioner of Patents, Washington, D. C."